United States Patent [19]

Huang et al.

[11] Patent Number: 4,478,991

[45] Date of Patent: Oct. 23, 1984

[54] SULFONIC ACID COPOLYMER ELECTROLYTE

[75] Inventors: Sun YI Huang, Stamford, Conn; Robert D. Giglia, Rye, N.Y.

[73] Assignee: American Cyanamid Company, Stamford, Conn.

[21] Appl. No.: 368,260

[22] Filed: Apr. 14, 1982

Related U.S. Application Data

[62] Division of Ser. No. 199,892, Oct. 23, 1980, Pat. No. 4,361,385.

[51] Int. Cl.³ ............................................. C08F 28/02
[52] U.S. Cl. .................................................... 526/287
[58] Field of Search ......................................... 526/287

[56] References Cited

U.S. PATENT DOCUMENTS 4,296,016 10/1981 Randin .................................. 526/287

Primary Examiner—Christopher A. Henderson
Attorney, Agent, or Firm—Gordon L. Hart

[57] ABSTRACT

In electrochromic devices having a layer of electrochromic material, e.g. tungsten oxide, in contact with a polymeric electrolyte layer, the stability and speed of the device are improved by using a copolymer of 2-acrylamido-2-methylpropanesulfonic acid and vinyl sulfonic acid as the polymeric electrolyte.

2 Claims, No Drawings

SULFONIC ACID COPOLYMER ELECTROLYTE

This is a division of copending application Ser. No. 199,892 filed Oct. 23, 1980, now U.S. Pat. No. 4,361,385.

The invention relates to improvements in persistent electrochromic devices which comprise polymeric electrolyte layers. A typical persistent electrochromic device has a thin film of persistent electrochromic material in direct surface contact, or at least ion-conductive contact, with a thin film of ion-conductive, electronically insulating, polymeric resin. The two films in contact as described are pressed between two opposed electrically conductive electrode surfaces to provide a path through the films for ionic conduction between the two electrode surfaces. Voltage applied across the electrodes induces a flow of ions between the two films. When the electrode next to the electrochromic layer is negative and the opposed electrode is positive, an applied e.m.f. of about one volt causes coloration of the electrochromic layer. When the polarity of the electrodes is reversed, the colored electrochromic layer bleaches to its colorless state as e.m.f. is applied.

In our copending U.S. patent application Ser. No. 70,753 filed Aug. 30, 1979 now abandoned we have described electrochromic devices of the kind having polymeric current-carrier-permeable layers in which the polymeric electrolyte material of such layer was poly(2-acrylamido-2-methylpropanesulfonic acid) homopolymer (AMPS homopolymer). Earlier, in U.S. Pat. No. 4,174,152, the present inventor Giglia, with D. W. Lipp and J. A. Sedlak, had described devices of the kind in which the polymeric electrolyte material was a hydrophilic copolymer of a selected acrylate or methacrylate co-monomer and a selected acid-group-containing co-monomer, e.g. 2-acrylamido-2-methylpropanesulfonic acid, the latter in proportion sufficient at least to make the copolymer hydrophilic.

In U.S. Pat. No. 4,116,545, T. B. Reddy had earlier described electrochromic devices in which the material of the polymeric current-carrier-permeable layers comprised vinyl sulfonic acid homopolymer. (Reddy used the name ethylene sulfonic acid; we prefer the name vinyl sulfonic acid).

In accordance with the present invention we use a copolymer of 2-acrylamido-2-methylpropanesulfonic acid (AMPS) and vinyl sulfonic acid (VSA) as the polymeric electrolyte material for the current-carrier-permeable insulating layer in electrochromic devices of the kind described.

In a most preferred embodiment we use a copolymer having each of the two acid-group-containing units present in equal proportions. Variations of the proportions within a range from about 2:3 to about 3:2 molar proportion AMPS:VSA will produce copolymers having performance about the same as the 1:1 copolymer. Other copolymers having molar proportions of AMPS:VSA down to about 0.01:1 will show an appreciable improvement of stability in electrochromic devices on comparison with the VSA homopolymers. Still other copolymers having molar proportions of AMPS:VSA up to about 10:1 will show appreciable improvement in conductivity in the devices on comparison with the AMPS homopolymer.

By comparison with AMPS homopolymer, the copolymers of AMPS-VSA are found to effect faster switching speed in electrochromic devices in which they are used. Switching speed can be expressed as the time required at a selected operating voltage to change the layer of persistent electrochromic material in the electrochromic device from its colorless state to a selected degree of coloration, and to then erase the same colored state to the original colorless state. Switching speed can also be expressed as the minimum operating voltage that will be required to effect a complete cycle in a given time period. Furthermore, using a film of the AMPS-VSA copolymer instead of the AMPS homopolymer in the device, the device is more tolerant to variations in the moisture content of the polymeric electrolyte layer, and this allows one to manufacture a long-life device using less exacting manufacturing techniques. Also it is found, at elevated ambient temperature, e.g. 50° C., the switching speed of devices made with the AMPS-VSA copolymer is more constant than that of devices made with the AMPS homopolymer due to the better water retention of the copolymer layers in the device.

Other factors being equal, the switching speed of an EC device containing polymeric electrolyte has been found to be inversely proportional to the equivalent weight of the polymer electrolyte. Equivalent weight (EW) is the molecular weight per acid group of the selected polymer. Polymer electrolytes having lower equivalent weights will have higher conductivity but unfortunately those with lower equivalent weight have usually proved to have poor stability in the electrochromic devices, causing reduced life for the devices. The use of polystyrene sulfonic acid (EW 184) and VSA homopolymer (EW 108) has resulted in very fast switching speeds in EC devices, but the cycle life was reduced by degradation of the polymer or of other components that contact the polymer in the electrochromic device. Degradation of some VSA homopolymers appears as a brown discoloration of the layer in the device. Other VSA homopolymer layers are found on cycling tests to cause development in the electrochromic layer of visible coloration that does not erase.

The use of the AMPS homopolymer (EW 207) in EC devices has resulted in excellent stability and moderately-good switching speed when the water content of the polymer layer in the device is carefully controlled. A significant improvement in performance has been found when a copolymer of VSA and AMPS is used. When the mole ratio of the respective units is 1/1, the EW is 157. A proportionate improvement in switching speed is observed, over the AMPS homopolymer, with this copolymer and its stability in the device is less sensitive to water content than that of the homopolymer. Operation at 50° C. is noticeably improved. Switching speed is faster and the operating life is extended.

EXAMPLE 1

Copolymer Preparation

Ten grams of 2-acrylamido-2-methylpropanesulfonic acid and 17.15 g. of 40% aqueous solution of vinyl sulfonic acid sodium salt are added to a reaction flask containing 74 g. of deionized and degassed water. Before mixing, the vinyl sulfonic acid sodium salt solution has been purified by passing the solution through an activated charcoal column. The reaction mixture is sparged with nitrogen, heated to 65° C. and 0.20 g. of succinic acid peroxide catalyst is added. The reaction is carried out maintaining the same conditions for 18 hours. Finally, the product mixture is cooled to 25° C. and a small portion of the mixture is cast on a glass slide.

The dried film is very transparent indicating complete polymerization. Also, unsaturation determination analysis shows residual monomer to be less than 0.16% of total weight. Infrared analysis shows 50 mole percent of the copolymerized monomer units contain the amide group. A 20 g. sample of the reaction product mixture is diluted by adding 80 g. of deionized water. The diluted solution is passed through a column containing Amberlite IR-120 ionic exchange resin. The copolymer solution is freeze-dried and stored in closed bottles.

EXAMPLE 2

Copolymer Preparation

A 40% aqueous solution weighing 185 g. and containing (0.57 mole) of vinyl sulfonic acid sodium salt is passed through a 60 cm. long, 20×50 mesh activated charcoal column. The 185 g. of VSA sodium salt 40% solution is charged with 118 g. (0.57 mole) of AMPS monomer and 114 g. of deionized and degassed water to a three-neck, one liter reaction flask equipped with a mechanical stirrer and nitrogen feed. Then 0.95 g. of succinic acid peroxide is added and the reaction mixture is kept at 60° C. for 16 hours. The reaction mixture is cooled to 25° C. and diluted with water to make a 4% by weight solution. The diluted product mixture is dialyzed for three days using a Spectraphor dialysis membrane having a molecular weight "cut off" of 3,500. Next, the copolymer solution is passed through a column containing Amberlite IR-120 ion exchange resin to convert the salt to acid and finally the copolymer is freeze-dried.

EXAMPLE 3

Electrochromic Devices

A polymeric electrolyte casting mixture is prepared by adding 13 ml. deionized water, 1 g. TiO$_2$ pigment 0.025 g. of silicone surfactant (Union Carbide L-5310) and 9 g. of the freeze-dried VSA-AMPS copolymer prepared in Example 1 to a ball mill and milling for 24 hours.

An electrochromic film on an electrode is prepared by evaporation of an amorphous film of tungsten oxide onto a glass substrate coated with conductive SnO$_2$ (commercially available as NESA ® glass). The tungsten oxide is deposited on the NESA glass in the image of a seven-segmented figure-8, 5 mm. high and with a thickness of 1500 Angstrom. A Mylar spacer ring 0.35 mm. thick is bonded with epoxy cement to the NESA glass forming a cavity over the electrochromic image. The polymer casting mixture is deposited therein to fill the cavity. The polymer mixture is dried under dry nitrogen gas to form a solid film. The film is humidified for 24 hours in nitrogen at 25° C. and 45% relative humidity RH. A second electrode consisting of paper-carbon structure of the kind described in U.S. Pat. No. 4,088,395 is pressed against the polymer layer with a second NESA plate backing the paper electrode. The two NESA plates are then edge sealed together using epoxy cement.

The assembled electrochromic device is tested at 50° C. by applying electrical pulses of about 1.0 volt D.C., first with the paper counterelectrode positive and the electrochromic electrode negative, passing a current of 320 microamperes for 0.9 second. The tungsten oxide colors to display a blue image. To erase the image the polarity is reversed and a current of approximately 340 microamperes is passed for 0.9 second. Two such devices were cycle tested (colored and erased) for $7 \times 10^5$ cycles without failure.

EXAMPLE 4

Electrochromic Devices

Three electrochromic devices are made as described in Example 3 except using several different polymeric electrolytes. The devices were tested on constant cycling apparatus to determine switching cycle life and to determine relative switching speeds. The polymeric electrolytes used, their equivalent weights and the test results obtained are set out in Table 1.

TABLE 1

| Polymeric Electrolyte | EW | Switching Cycles $\times 10^6$ | Relative Switching Speed |
|---|---|---|---|
| VSA Homopolymer | 108 | 3 | 1.9 |
| AMPS Homopolymer | 207 | 10 | 1.0 |
| VSA-AMPS Copolymer (1:1 molar) | 157 | 8 | 1.3 |

The VSA-AMPS copolymer has slower switching speed than the VSA homopolymers, but it offers a longer switching cycle life. It has shorter cycle life than the AMPS homopolymer but faster switching speed. In many of the present uses for electrochromic devices the VSA-AMPS copolymer is preferred for its combination of cycle life and switching speed properties.

We claim:

1. A water-soluble, transparent-film-forming copolymer of 2-acrylamido-2-methylpropane sulfonic acid (AMPS) and vinyl sulfonic acid (VSA) wherein the proportion of AMPS units to VSA units in the copolymer is in the range from 3:2 to 2:3.

2. A copolymer defined by claim 1 wherein the proportion of AMPS units to VSA units in the copolymer is 1:1.

* * * * *